(12) United States Patent
Maykov et al.

(10) Patent No.: US 10,374,929 B2
(45) Date of Patent: *Aug. 6, 2019

(54) MEASURING DELETION OF COOKIES INCLUDED IN BROWSERS USED BY ONLINE SYSTEM USERS

(71) Applicant: Facebook, Inc., Menlo Park, CA (US)

(72) Inventors: Alexey Maykov, Redmond, WA (US); Ryan Edward Huettl, Bothell, WA (US); Anirudhan Vijayakanthan, Seattle, WA (US); Nipun Mathur, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 49 days.

This patent is subject to a terminal disclaimer.

(21) Appl. No.: 15/390,982

(22) Filed: Dec. 27, 2016

(65) Prior Publication Data

US 2017/0111255 A1  Apr. 20, 2017

Related U.S. Application Data

(63) Continuation of application No. 14/086,123, filed on Nov. 21, 2013, now Pat. No. 9,565,090.

(51) Int. Cl.
| | |
|---|---|
| *G06F 15/173* | (2006.01) |
| *H04L 12/26* | (2006.01) |
| *H04L 29/08* | (2006.01) |

(52) U.S. Cl.
CPC .............. *H04L 43/10* (2013.01); *H04L 43/14* (2013.01); *H04L 67/02* (2013.01); *H04L 67/142* (2013.01); *H04L 67/146* (2013.01); *H04L 67/20* (2013.01)

(58) Field of Classification Search
CPC ........ H04L 67/146; H04L 67/20; H04L 67/22

USPC .................................................. 709/223, 224
See application file for complete search history.

(56) References Cited

U.S. PATENT DOCUMENTS

| | | | |
|---|---|---|---|
| 8,788,617 B2 | 7/2014 | Cardozo | |
| 8,856,869 B1* | 10/2014 | Brinskelle | ............... H04L 63/08 |
| | | | 726/12 |
| 2013/0145022 A1* | 6/2013 | Srivastava | ......... G06Q 30/0241 |
| | | | 709/224 |

OTHER PUBLICATIONS

United States Office Action, U.S. Appl. No. 14/086,123, dated Mar. 24, 2016, 35 pages.

* cited by examiner

*Primary Examiner* — Wing F Chan
*Assistant Examiner* — Andrew Woo
(74) *Attorney, Agent, or Firm* — Fenwick & West LLP

(57) ABSTRACT

An online system determines a frequency with which its users delete information stored in a browser on client devices associated with each user. When a user accesses the online system, the online system determines a user identifier associated with the user and determines if one or more conditions are satisfied based on information received from a browser used to access the online system. If a condition is satisfied, the online system communicates an instruction to the browser to communicate information associated with a third party and the user identifier to the third party. Information previously stored in the browser and associated with the user identifier is compared to information associated with the user identifier received from the browser. Deletion of information stored in the browser is determined when stored information associated with the user identifier differs from received information associated with the user identifier.

14 Claims, 3 Drawing Sheets

| Time Stamp | User Identifier | Browser Cookie | User Agent | IP Address |
|---|---|---|---|---|
| 07012013.081356 | 1111 | A0222 | UA1 | 74.125.157.79 |
| 07032013.164222 | 1111 | A0222 | UA1 | 74.125.157.79 |
| 07132013.115216 | 1111 | A0333 | UA1 | 74.125.157.79 |
| 07192913.025524 | 1111 | A0444 | UA2 | 212.58.241.121 |

FIG. 4

MEASURING DELETION OF COOKIES INCLUDED IN BROWSERS USED BY ONLINE SYSTEM USERS

CROSS REFERENCE TO RELATED APPLICATIONS

This application is a continuation of U.S. application Ser. No. 14/086,123, filed Nov. 21, 2013, which is incorporated by reference in its entirety.

BACKGROUND

This disclosure relates generally to online systems, and in particular to measuring deletion of cookies by users of an online system.

An online system allows its users to connect to and communicate with other online system users. Users may create profiles on an online system that are tied to their identities and include information about the users, such as interests and demographic information. The users may be individuals or entities such as corporations or charities. Because of the increasing popularity of online systems and the increasing amount of user-specific information maintained by online systems, an online system provides an ideal forum for advertisers to increase awareness about products or services by presenting advertisements to online system users. For example, presenting advertisements to users of an online system allows an advertiser to persuade online system users to take an action regarding the advertiser's products or services. Many online systems generate revenue by charging advertisers for each presentation of an advertisement to an online system user (e.g., each "impression" of the advertisement) or interaction with an advertisement by an online system user.

Effectiveness of advertising campaigns conducted on an online system may be improved by storing cookies on a device and/or browser used to access the online system. These cookies enable advertisers to store and retrieve information describing a user associated with the device or browser. For example, a cookie allows an advertiser to determine a user's preferred websites and the user's browsing activity (e.g., information describing the user logging into the online system, describing the user's interactions with advertisements and online content) over a variable time-frame. Cookies may also allow a user to store information describing the user in a cookie associated with a website for subsequent retrieval when the user accesses the website. Content providers may also use cookies to generate browsing histories for various users that may be used to by a content provider to target the user with advertisements for specific products or services.

However, users may delete cookies stored by a browser to clear their browsing histories, to reclaim storage space on a device, and/or to protect their privacy. Users may delete all cookies stored by a browser or may delete cookies associated with by particular websites. When a user deletes cookies, content providers are unable to ensure that the proper content is presented to a particular user.

SUMMARY

To improve an online system's ability to provide a rich environment for content providers and users, an online system tracks the frequency with which users of the online system delete cookies maintained by a browser on a user's client device ("cookie churn"). For example, the online system analyzes data describing cookie churn based on an identifier associated with a user of the online system, such as a username for accessing the online system, and one or more cookies stored in a browser executing on a client device associated with the user by a third party. The online system may also track additional information when the user logs into the online system, such as a browser or a device identifier (e.g., an Internet Protocol address) and a time associated with the user's login to the online system. For example, the online system communicates a cookie to the browser on the user's client device to track times when a user logs into the online system and to track browser or device identifiers.

When a user logs into the online system via a browser, the online system provides an identifier associated with the online system user to a third party system. When the third party system receives the user identifier, it communicates a cookie associated with the third party system to the browser, where it is stored. The user identifier and cookie associated with the third party system allow the third party system to determine data associated with the deletion of cookies by the user. For example, the user identifier is a user name associated with the user by the online system and may be obfuscated before being provided to the third party system. In one embodiment, the user identifier is a hashed user identifier included in a network address, such as a uniform resource locator (URL). The third party system may be a web-analytics provider or other entity that performs data analysis. When the user logs into the online system via the browser, the online system may obtain additional information associated with the login event, such as a browser identifier, a device identifier (e.g., an Internet Protocol address), and a time associated with the login. The online system may store a cookie in the browser to store this additional information.

Each time a user logs into the online system via a browser, the online system determines whether one or more conditions are satisfied based on information associated with a cookie previously stored in the browser by the online system. For example, the online system determines whether a specified amount of time has elapsed between the current login to the online system and a most recent previous login to the online system. As an additional example, the online system determines whether the user associated with a client device identifier or a browser identifier logging into the online system is different from a user that previously logged into the online system using the same client device identifier or browser identifier. As yet another example, the online system determines whether a cookie has been previously stored in the browser used to log into the online system by the online system.

If at least one condition is satisfied, the online system sends a redirect request to the browser including an identifier associated with the user logging into the online system and an instruction to redirect the user identifier and a cookie previously stored in the browser by a third party system to the third party system. In one embodiment, the online system redirects the user identifier along with one or more instructions to generate a cookie associated with the online system and to redirect the user identifier and a cookie stored in the browser by the third party system to the third party system if the online system has not previously stored a cookie in the browser. The online system may use a tracking mechanism (e.g., a tracking pixel) associated with one or more advertisements to determine whether to redirect a user identifier and a cookie stored by the browser to the third party system. If no conditions are satisfied, the online system does not communicate instructions to redirect the user identifier and a cookie previously stored by the third party system to the third party system.

The third party system compiles information obtained from the user identifier received from the browser and cookie stored in the browser by the third party system. For example, the third party system compiles information associated with a user identifier that includes a device identifier, a browser identifier, a time associated with the user logging into the online system, and a value associated with the cookie stored in the browser by the third party system. A cookie stored in the browser by the online system may also be used by the third party system to compile information associated with the user identifier. For example, the cookie stored in the browser by the online system includes a browser identifier or a client device identifier as well as timestamps indicating times when the user logged into the online system. If the cookie stored in the browser by the third party system is missing a value associated with a last login session or is not received by the third party system (i.e., the cookie has been deleted), the third party system communicates a value describing the current login to the online system or communicates a new cookie to the browser to be stored. The new value for the browser cookie or the new cookie is included in the information compiled by the third party system.

The online system may analyze the data compiled by the third party system to determine a frequency with which users of the online system delete cookies stored by the browser on a client device associated with the users. In one embodiment, the online system determines the frequency with which new browser cookies are stored in a browser by the third party system based on a browser identifier associated with a user or with a device identifier associated with the user. For example, if a user identifier and associated device identifier are associated with different cookies set by a third party, the online system determines that a cookie associated with the third party system and associated with the combination of user identifier and device identifier was deleted. Information describing the frequency of cookie deletion by a user may be represented as an average rate or as a histogram.

BRIEF DESCRIPTION OF THE DRAWINGS

FIG. 4 is an example of information received from a browser and stored by a third party system, in accordance with an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
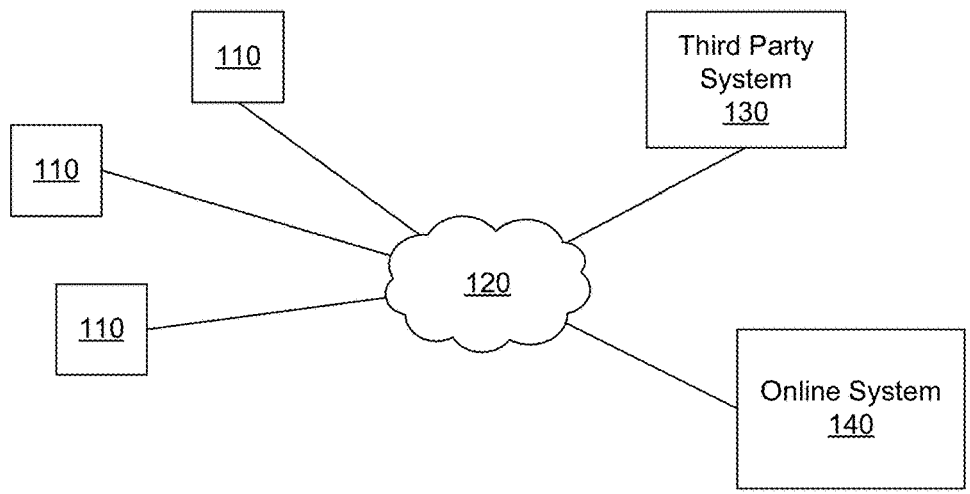
FIG. 1 is a block diagram of a system environment in which an online system operates, in accordance with an embodiment.

FIG. 1 is a high level block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. The embodiments described herein can be adapted to online systems that are not online systems.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
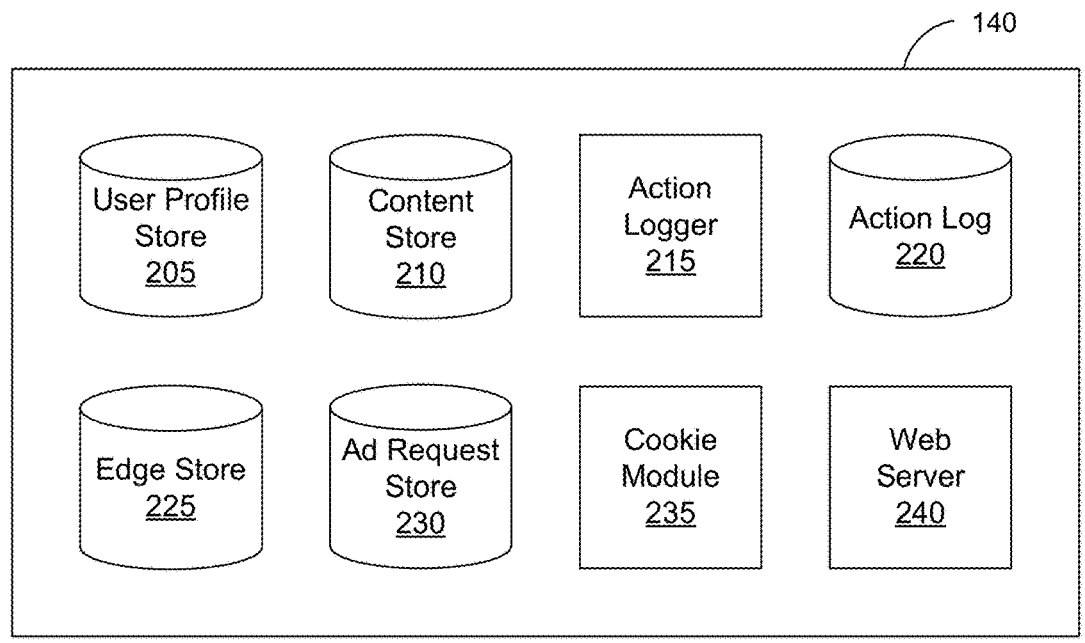
FIG. 2 is a block diagram of an online system, in accordance with an embodiment.

FIG. 2 is a block diagram of an architecture of the online system 140, which may be a social networking system in some embodiments. The online system 140 shown in FIG. 2 includes a user profile store 205, a content store 210, an action logger 215, an action log 220, an edge store 225, an ad request store 230, a cookie module 235, and a web server 240. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the social networking system 140 is associated with a user profile, which is stored in the user profile store 205. A user profile includes declarative information about the user that was explicitly shared by the user and may also include profile information inferred by the social networking system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the social networking system 140, user profiles may also be stored for entities such as businesses or organizations. This allows an entity to establish a presence on the social networking system 140 for connecting and exchanging content with other social networking system users. The entity may post information about itself, about its products or provide other information to users of the social networking system using a brand page associated with the entity's user profile. Other users of the social networking system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Social networking system users may create objects stored by the content store 210, such as status updates, photos tagged by users to be associated with other objects in the social networking system, events, groups or applications. In some embodiments, objects are received from third-party applications or third-party applications separate from the social networking system 140. In one embodiment, objects in the content store 210 represent single pieces of content, or content "items." Hence, social networking system users are encouraged to communicate with each other by posting text and content items of various types of media to the social networking system 140 through various communication channels. This increases the amount of interaction of users with each other and increases the frequency with which users interact within the social networking system 140.

The action logger 215 receives communications about user actions internal to and/or external to the social networking system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the social networking system 140 to track user actions on the social networking system 140, as well as actions on third party systems 130 that communicate information to the social networking system 140. Users may interact with various objects on the social networking system 140, and information describing these interactions is stored in the action log 220. Examples of interactions with objects include: commenting on posts, sharing links, checking-in to physical locations via a mobile device, accessing content items, and any other suitable interactions. Additional examples of interactions with objects on the social networking system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the social networking system 140 as well as with other applications operating on the social networking system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the social networking system 140. For example, an e-commerce website may recognize a user of a social networking system 140 through a social plug-in enabling the e-commerce website to identify the user of the social networking system 140. Because users of the social networking system 140 are uniquely identifiable, e-commerce websites, such as in the preceding example, may communicate information about a user's actions outside of the social networking system 140 to the social networking system 140 for association with the user. Hence, the action log 220 may record information about actions users perform on a third party system 130, including webpage viewing histories, advertisements that were engaged, purchases made, and other patterns from shopping and buying.

In one embodiment, the edge store 225 stores information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 140, such as expressing interest in a page on the social networking system 140, sharing a link with other users of the social networking system 140, and commenting on posts made by other users of the social networking system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the social networking system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the social networking system 140 over time to approximate a user's interest in an object or another user in the social networking system 140 based on the actions performed by the user. A user's affinity may be computed by the social networking system 140 over time to approximate a user's interest for an object, interest, or other user in the social networking system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

One or more advertisement requests ("ad requests") are stored in the ad request store 230. An advertisement request includes advertisement content and a bid amount. The advertisement content is text data, image data, audio data, video data, or any other data suitable for presentation to a user. In various embodiments, the advertisement content also includes a network address specifying a landing page to which a user is directed when the advertisement is accessed.

The bid amount is associated with an advertisement by an advertiser and specifies an amount of compensation the advertiser provides the online system 140 if the advertisement is presented to a user or accessed by a user. In one embodiment, the bid amount is used by the online system to determine an expected value, such as monetary compensation, received by the online system 140 for presenting the advertisement to a user, if the advertisement receives a user interaction, or based on any other suitable condition. For example, the bid amount specifies a monetary amount that the online system 140 receives from the advertiser if the advertisement is displayed and the expected value is determined based on the bid amount and a probability of a user accessing the displayed advertisement.

Additionally, an advertisement request may include one or more targeting criteria specified by the advertiser. Targeting criteria included in an advertisement request specify one or more characteristics of users eligible to be presented with advertisement content in the advertisement request. For example, targeting criteria are used to identify users having user profile information, edges or actions satisfying at least one of the targeting criteria. Hence, targeting criteria allow an advertiser to identify users having specific characteristics, simplifying subsequent distribution of content to different users.

In one embodiment, targeting criteria may specify actions or types of connections between a user and another user or object of the online system 140. The targeting criteria may also specify interactions between a user and objects performed external to the online system 140, such as on a third party system 130. For example, targeting criteria identifies users that have taken a particular action, such as sending a message to another user, using an application, joining a group, leaving a group, joining an event, generating an event description, purchasing or reviewing a product or service using an online marketplace, requesting information from a third-party system 130, or any other suitable action. Including actions in targeting criteria allows advertisers to further refine users eligible to be presented with content from an advertisement request. As another example, targeting criteria identifies users having a connection to another user or object or having a particular type of connection to another user or object.

The cookie module 235 retrieves information stored in a browser executing on a client device 110 by the online system 140, such as information associated with cookies stored in a web browser. Examples of information stored in a browser by the online system 140 include a time stamp indicating a time when a user associated with the browser most recently accessed the online system 140 or any other information associated with the user. For example, the cookie module 235 retrieves the date and time that the user most recently logged into the online system 140 from a cookie stored by the online system 140 in a browser executing on a client device 110.

Additionally, the cookie module 235 determines whether to send a request to a browser executing on a client device 110 to send an identifier associated with a user and information stored in the browser by a third party system 130 to the third party system 130. In one embodiment, the cookie module 235 sends the request to the browser if one or more conditions are satisfied based on information retrieved from the browser that was stored in the browser by the online system 140. For example, the cookie module 235 sends the request to the browser if a difference between a time associated with a current login to the online system 140 by the user and a time associated with a most recent prior login to the online system 140 by the user equals or exceeds a threshold value. Information identifying the most recent prior login to the online system 140 may be retrieved by the cookie module 235 from a timestamp in a cookie stored in the browser by the online system 140. As an additional example, the cookie module 235 sends the request to the browser if a user identifier associated with a received login request differs from a user identifier included in a cookie stored in the browser from which the login request was received by the online system 140. In some embodiments, information identifying a user by the online system 140 may be encrypted by the online system 140 to protect the user's privacy, so the cookie module 235 decrypts information stored in a browser by the online system 140 to obtain user-identifying information from the information stored in the browser.

In some embodiments, the cookie module 235 determines whether to communicate user-identifying information and information stored in a browser by a third party system 130 to the third party system 130 when certain content is presented via the browser by the online system 140. For example, when an advertisement is presented to a user logging into the online system 140, the cookie module 235 determines whether a condition is satisfied and includes a tracking pixel or other tracking mechanism in the advertisement if the condition is satisfied. The tracking pixel includes a redirect command identifying the third party system and information identifying the user of the online system, so when the advertisement is presented by the browser, the browser renders the tracking pixel and executes the redirect command to communicate information to the third party system 130.

The cookie module 235 also modifies information stored in a browser by the online system 140. In one embodiment, the cookie module 235 modifies values stored in a cookie stored in the browser by the online system 140. For example, the cookie module 235 overwrites a time stamp associated with a user's most recent previous login to the online system 140 with the date and time of a current login.

The web server 245 links the online system 140 via the network 120 to the one or more client devices 110, as well as to the one or more third party systems 130. The web server 245 serves web pages, as well as other content, such as JAVA®, FLASH®, XML and so forth. The web server 245 may receive and route messages between the online system 140 and the client device 110, for example, instant messages, queued messages (e.g., email), text messages, short message service (SMS) messages, or messages sent using any other suitable messaging technique. A user may send a request to the web server 245 to upload information (e.g., images or videos) that is stored in the content store 210. Additionally, the web server 245 may provide application programming interface (API) functionality to send data directly to native client device operating systems, such as IOS®, ANDROID™, WEBOS® or BlackberryOS.

Tracking Cookie Deletion

Figure 3:
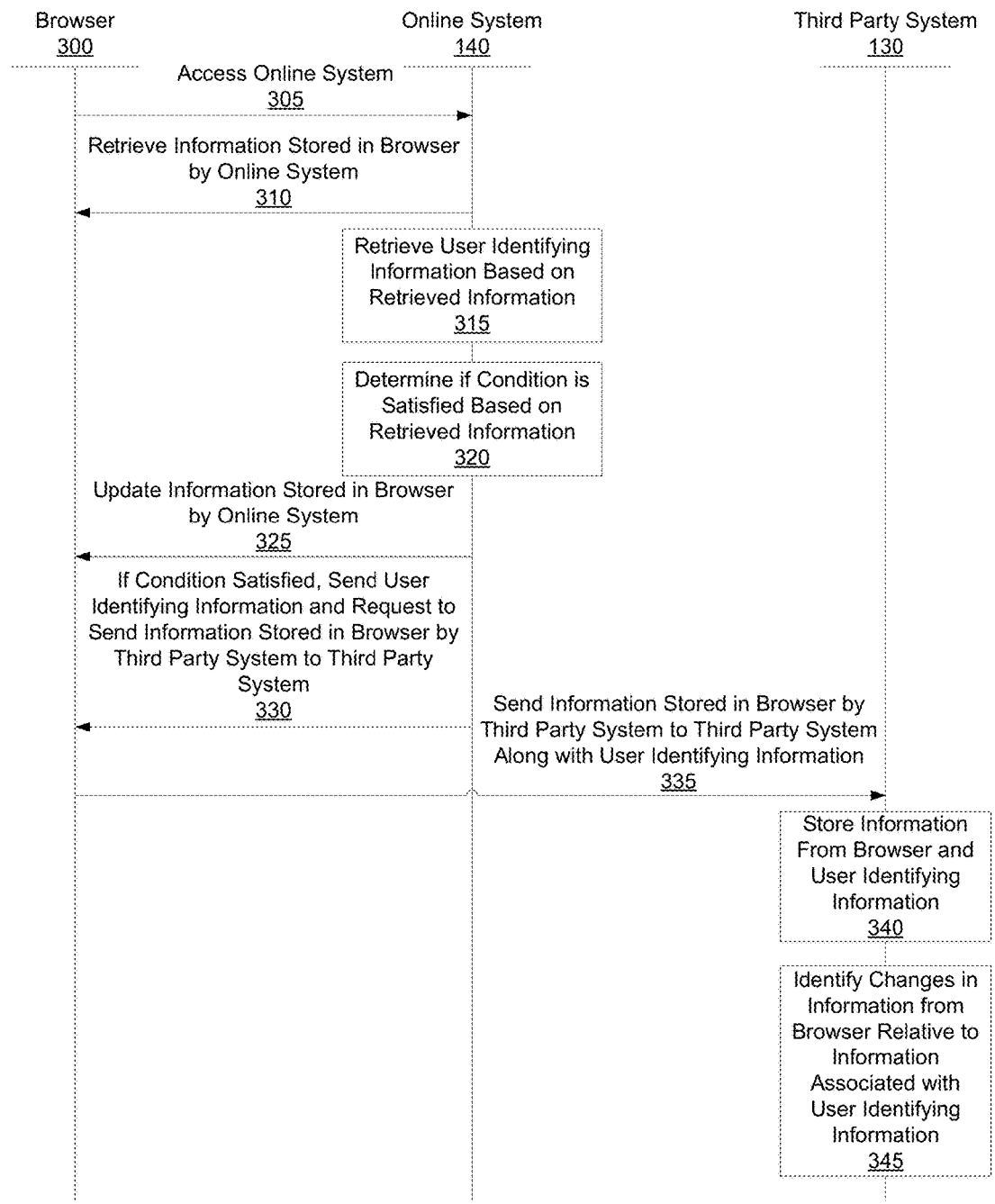
FIG. 3 is an interaction diagram of a method for determining an online system user's frequency of cookie deletion, in accordance with an embodiment.

FIG. 3 is an interaction diagram of one embodiment of a method for determining an online system user's frequency of cookie deletion. The online system 140 receives 305 a request to log into, or to otherwise access, the online system 140 from a browser 300 executing on a client device 110 associated with a user of the online system 140. When the online system 140 receives 305 the request, the online system 140 retrieves 310 information stored in the browser 300 by the online system 140. For example, the online system 140 retrieves a cookie associated with the online system 140 from the browser 300. The retrieved cookie may include information used by the online system 140 to identify a user, a timestamp associated with a prior login to the online system 140 by the user, preferences or settings of the user for accessing the online system 140, a browser identifier, a client device identifier, and/or other suitable information. For example, the cookie includes information associated with the user for accessing the online system 140, such as a user name or password, without the user providing login information to the online system 140. In one embodiment, the online system 140 communicates information to the browser 300 to be stored in the browser 300 if the browser 300 does not include information stored by the online system 140. For example, the online system 140 communicates a cookie including information identifying the user and a timestamp indicating when the online system 140 received the request to access, or login to, the online system 140 to the browser 300 to be stored.

Based on the information retrieved from the browser 300, the online system 140 retrieves 315 user-identifying information from the user profile store 205, such as a user identifier or other information from a user profile associated with the user requesting access to the online system 140. The online system 140 determines 320 if one or more conditions are satisfied based on the information retrieved from the browser 300 and the user-identifying information. In one embodiment, the cookie module 235 determines whether a difference between a time associated with the current request to access or to login to the online system 140 and a time associated with a most recent previous request to access or to login to the online system 140 by the is at least a threshold amount of time. For example, the social networking system 140 determines if a difference between a time associated with the received request and a timestamp identified from the information retrieved 310 from the browser 300 equals or exceeds the threshold amount of time. As an example, if at least two weeks has elapsed between the online system receiving 305 the request from the browser 300 and the online system 140 receiving a most recent previous request to access the online system 140, the condition is determined 320 to be satisfied. As an additional example, the online system 140 determines 320 a condition is satisfied if the user associated with the received request differs from a user associated with a user identifier identified from the information received 310 from the browser 300 from which the request was received, a condition is determined 320 to be satisfied. In one embodiment, the online system 140 also updates 325 the information stored in the browser 300 by the online system 140. For example, the online system 140 updates 325 a time stamp associated with a most recent login to, or access of, the online system 140 by the user by overwriting a previously stored time stamp with the date and time associated with receipt of the request.

If one or more conditions are determined 320 to be satisfied, the online system 140 sends 330 user-identifying information and instructions to the browser 300 to communicate information stored in the browser 300 by a third party system 130 to the third party system 130. In one embodiment, the online system 140 communicates 330 a redirect request to the browser 300 that includes a network address associated with the third party system 130 and user-identifying information. For example, the redirect request is included in a tracking pixel, or other tracking mechanism, included in an advertisement presented to a user by the online system 140 via the browser 300. When the advertisement is rendered by the browser 300, the tracking pixel communicates the information stored in the browser 300 by a third party system 130 to the third party system 130 along with user-identifying information. Alternatively, the user-identifying information and information stored in the browser 300 by the third party system 130 are automatically redirected to the third party system 130 when the user logs into or otherwise accesses the online system 140.

The user-identifying information may be a hashed value generated from a user identifier associated with the user by the online system 140 or another value generated from the user identifier associated with the user by the online system 140. Hashing or otherwise obfuscating the identifying information sent to the browser 300 allows the online system 140 to protect the privacy of its users while allowing the online system 140 to provide the third party system 130 with information associated with particular users by the online system 140. Based on the instructions to communicate information stored in the browser 300 by the third party system 130 to the third party system 130, the browser 300 sends 335 the information stored in the browser 300 by the third party system 130 to the third party system 130 along with the user-identifying information.

The third party system 130 stores 340 the information received from the browser 300 and user-identifying information associated with the information received from the browser 300. Referring to FIG. 4, an example of information 400 stored by the third party system 130 is shown. In the example of FIG. 4, the third party system 130 compiles data received from various browsers 300. For example, the information 400 stored by the third party system 130 includes a timestamp 410 indicating when the third party system 130 received data from a browser 300, a user identifier 420 associated with data received from the browser 300, and data 430 stored by the third party system 130 in the browser 300 and received from the browser 300 (e.g., a browser cookie). In one embodiment, the third party system 130 stores a browser identifier 440 of the browser 300. The browser identifier 440 of the browser 300 identifies a client device type (e.g., a mobile phone), a browser type, version number of the browser, an operating system name and version number, and/or other identifying information associated with the browser 300. In some embodiments, the third party system 130 stores a client device identifier (e.g., an Internet Protocol address) 450 for a client device 110 associated with the browser 300.

If the third party system 130 does not identify a value associated with the data 430 stored by the third party system 130 in the browser 300, (e.g., the user deleted a cookie stored by the third party system 130 in the browser 300), the third party system 130 stores a new value associated with the third party system 130 in the browser 300 or stores new data in the browser 300. Information describing the new values or new data stored in the browser 300 by the third party system 130 may be included in the information 400 stored by the third party system 130 in place of, or in addition to, the user identifier 420. In some embodiments, the user identifier 420 included in the stored information 400 is an encrypted version of the user-identifying information retrieved by the online system 140. For example, as shown in the example of FIG. 4, the stored information 400 is a table including an entry associated with each request to access the online system 140 satisfying one or more conditions to send 335 information from the browser to the third party system 130. In the example shown by FIG. 4, each entry of the table includes a timestamp 410, a user identifier 420, data 430 received from the browser 300 (e.g., a browser cookie), a browser identifier 440, and a device identifier 450. The identifier 420 may be subsequently used to identify information stored by the third party system 130 in the browser 300 and associated with different users of the online system 140.

Based on the stored information and the information received from the browser, the third party system 130 identifies 345 changes between stored information associated with user-identifying information and the information received from the browser 300 associated with the user-identifying information. However, in other embodiments, the third party system 130 communicates the stored information associated with user-identifying information and the information received from the browser 300 associated with the user-identifying information, to the online system 140, which identifies 345 between the stored information and the information received from the browser 300. For example, in FIG. 4, the first three entries are associated with the same user (i.e., the user with user identifier 1111) using the browser (i.e., the browser with the user agent UA1). In this example, the third entry indicates that the cookie associated with the user identifier 1111 and the user agent UA1 has been cleared (or deleted) because the browser cookie changed from a value of A0222 in the second entry to A0333 in the third entry. The frequency with which an online system user associated with the browser 300 deletes information stored in the browser 300 may be determined by changes between the information received from the browser 300 and associated with user-identifying information associated with the user and information associated with the user-identifying information associated with the user previously received by the third party system 130 and stored. For example, if the third party system 130 receives information from the browser 300 associated with user-identifying information and a client device identifier that differs from information stored by the third party system 130 and associated with the same user-identifying information and client device identifier, the third party system 130 determines that the user associated with the user-identifying information has deleted information stored by the third party system 130 in the browser 300 executing on a client device 110 associated with the client device identifier, or the online system 140 makes the determination based on information received from the third party system 130. As an additional example, the third party system 130 determines that a user has deleted information associated with the third party system 130 from the browser 300 when information received from the browser 300 and associated with the user does not include a cookie that information stored by the third party system 130 indicated was previously stored in the browser 300, or the online system 140 makes the determination based on information received from the third party system 130. Alternatively, the third party system 130 determines that a user has deleted information associated with the third party system 130 from the browser 300 if information received from the browser 300 and associated with the user includes a cookie differing from a cookie identified by information stored by the third party system 130 as associated with the user and/or a client device identifier from which the information was received; alternatively, the third party system 130 communicates information to the online system 140, which makes the determination.

In some embodiments, data stored by the third party system 130 is communicated to the online system 130, which analyzes the data stored by the third party system 130 to determine changes in data stored by the third party system 130 in the browser 300 based on characteristics (e.g., age, gender, location) of users associated with user-identifying information. For example, the online system 140 generates a histogram describing the frequency with which users of the online system 140 delete their cookies based on the users' geographic location. Alternatively, the online system 140 generates a report describing the frequencies with which users having different characteristics delete information stored in browsers 300 by a third party system 130.

The third party system 130 may also communicate additional information to the browser 300 to be stored or may modify information stored in the browser 300 by the third party system 130. For example, the third party system 130 stores an encrypted version of the user identifying information from the online system 140 identifier to the browser 300 after receiving the information from the browser 300. This additional information communicated to the browser 300 may be subsequently used to identify individual users of the online system 140 along with information stored by the third party system 130 in the browser 300.

While FIG. 3 describes an embodiment where the third party system 130 stores 340 information received from the browser and user-identifying information, as well as identifies 345 changes in received browser information relative to stored information, in other embodiments, the browser 300 sends 335 information stored in the browser 335 to the online system 140 along with user-identifying information. The online system 140 stores 340 the received information and user-identifying information, as described above. From previously-stored stored information associated with the user identifying information and the received information from the browser, the online system 140 identifies 345 changes in the received information and the stored information, as described above.

SUMMARY

The foregoing description of the embodiments has been presented for the purpose of illustration; it is not intended to be exhaustive or to limit the embodiments to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Some embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Some embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the embodiments be limited not by this detailed description, but rather by any claims that issue on an application based hereon. Accordingly, the disclosure of the embodiments is intended to be illustrative, but not limiting, of the scope of the embodiments, which is set forth in the following claims.

What is claimed is:

1. A method comprising:
    retrieving user identifying information associated with a user of a plurality of users of an online system;
    retrieving a cookie from a client device from which a request to connect to the online system was received, the client device associated with the user of the online system;
    determining a condition is satisfied based on the retrieved cookie and the retrieved user identifying information, wherein determining the condition is satisfied comprises:
        determining user identifying information associated with a prior connection to the online system from the client device based on the retrieved cookie; and determining if the user identifying information associated with the prior connection to the online system matches the retrieved user identifying information associated with the user; or
        determining a time associated with receiving a request to connect to the online system based on the retrieved user identifying information associated with the user; determining a time when the user most recently connected to the online system based on the retrieved cookie; and determining that a difference between the time associated with the received request and the time when the user most recently connected to the online system exceeds a threshold value; and
    responsive to the determined condition being satisfied, sending to the client device the retrieved user identifying information associated with the user and a plurality of redirect instructions, wherein the plurality of redirect instructions cause a browser on the client device to communicate information stored in the browser by a third party system and the retrieved user identifying information to the third party system.

2. The method of claim 1, further comprising:
    responsive to receiving the request to connect to the online system from the client device associated with the user of the online system, for each received request:
        storing information describing a status of the retrieved cookie from the client device in association with the retrieved user identifying information associated with the user of the online system in a log;
        comparing, for each of the retrieved user identifying information, a plurality of the logged statuses of the cookie associated with a matching user identifying information, for each of the retrieved user identifying information; and
        determining a metric describing a frequency with which cookies stored in the client device from which the request was received are deleted for the plurality of users based at least in part on the comparing, the frequency determined based at least on one or more changes in the stored information.

3. The method of claim 2, wherein determining the metric describing the frequency with which the cookies stored in the client device from which the request was received are deleted for the plurality of users based at least in part on the comparing, further comprises:

determining that the user of the online system deleted the cookies stored in the client device if a cookie included in the log associated with the user of the online system and associated with a prior connection to the online system by the user does not match the cookie retrieved from the client device from which the request associated with the user was received.

4. The method of claim 2, wherein storing the information describing the status of the retrieved cookie in association with the retrieved user identifying information associated with the user of the online system in the log, further comprises:

determining that one or more conditions are satisfied based at least in part on the retrieved cookie and the retrieved user identifying information; and storing the information describing the status of the retrieved cookie if the determined condition is satisfied.

5. The method of claim 4, wherein storing the information describing the status of the retrieved cookie if the determined condition is satisfied, further comprises:

storing the information describing the status of the retrieved cookie if the difference equals or exceeds the threshold value.

6. The method of claim 4, wherein storing the information describing the status of the retrieved cookie if the determined condition is satisfied, further comprises:

storing the information describing the status of the retrieved cookie if the user identifying information associated with a prior connection to the online system does not match the retrieved user identifying information associated with the user.

7. A method comprising:

receiving a request to connect to an online system from a client device associated with a user of a plurality of users of the online system;

retrieving user identifying information associated with the user;

retrieving a cookie from the client device from which the request to connect to the online system was received, the client device associated with the user of the online system;

determining a condition is satisfied based on the retrieved cookie and the retrieved user identifying information, wherein determining the condition is satisfied comprises:

determining a time associated with the received request to connect to the online system; determining a time when the user most recently connected to the online system based on the retrieved information stored in a browser on the client device by the online system; and determining that a difference between the time associated with the received request and the time when the user most recently connected to the online system exceeds a threshold value; or determining a user identifier associated with a prior connection to the online system from the retrieved information stored in a browser on the client device by the online system; and determining if the user identifier associated with the prior connection to the online system matches the retrieved user identifying information associated with the user by the online system;

modifying the retrieved user identifying information stored by the online system in the browser on the client device based at least in part on the received request to connect to the online system; and responsive to the determined condition being satisfied, sending to the client device the retrieved user identifying information associated with the user and a plurality of redirect instructions, wherein the plurality of redirect instructions cause the browser on the client device to communicate information stored in the browser by a third party system and the retrieved user identifying information to the third party system.

8. The method of claim 7, wherein the user identifying information comprises a hash value generated by hashing the user identifying information associated with the user by the online system.

9. The method of claim 7, further comprising:

sending a request to the browser to communicate the information stored in the browser executing on the client device by the third party system and the retrieved user identifying information identifying the user to the third party system if the determined condition is satisfied;

receiving information from the third party system describing the information stored in the browser executing on the client device by the third party system at different times and associated with the retrieved user identifying information identifying the user; and determining a metric describing a frequency with which the user removes the information stored in the browser executing on the client device based at least in part on the received information from the third party system.

10. The method of claim 9, wherein determining the metric describing the frequency with which the user removes the information stored in the browser executing on the client device based at least in part on the received information from the third party system, further comprises:

determining that the user has removed the information stored in the browser if the information stored in the browser by the third party system during a prior time differs from the information stored in the browser by the third party system at the time of the request to connect to the online system.

11. The method of claim 9, wherein sending the request to the browser to communicate the information stored in the browser by the third party system and the retrieved user identifying information identifying the user to the third party system if the determined condition is satisfied, further comprises:

sending the request to the browser if the difference between the time associated with the received request and the time when the user most recently connected to the online system equals or exceeds the threshold value.

12. The method of claim 9, wherein sending the request to the browser to communicate the information stored in the browser by the third party system and retrieved user identifying information identifying the user to the third party system if the determined condition is satisfied, further comprises:

sending the request to the browser if the user identifier associated with the prior connection to the online system does not match the retrieved user identifying information associated with the user by the online system.

13. The method of claim 9, wherein sending the request to the browser to communicate the information stored in the browser executing on the client device by the third party system and the retrieved user identifying information identifying the user to the third party system if the determined condition is satisfied, further comprises:
sending a redirect request to the browser including a network address including the user identifying information.

14. A computer program product comprising a non-transitory computer readable storage medium having instructions encoded therein that, when executed by a processor cause the processor to:
retrieve user identifying information associated with a user of a plurality of users of an online system;
retrieve a cookie from a client device from which a request to connect to the online system was received, the client device associated with the user of the online system;
determine a condition is satisfied based on the retrieved cookie and the retrieved user identifying information, determining the condition comprises:
determining user identifying information associated with a prior connection to the online system from the client device based on the retrieved cookie; and
determining if the user identifying information associated with the prior connection to the online system matches the user identifying information associated with the user; or
determining a time associated with receiving a request to connect to the online system;
determining a time when the user most recently connected to the online system based on the retrieved cookie; and
determining that a difference between the time associated with the received request and the time when the user most recently connected to the online system exceeds a threshold value; and
responsive to the determined condition being satisfied, send to the client device the retrieved user identifying information associated with the user and a plurality of redirect instructions, wherein the plurality of redirect instructions cause a browser on the client device to communicate information stored in the browser by a third party system and the retrieved user identifying information to the third party system.

* * * * *